Aug. 16, 1960 R. L. COMER 2,949,376
COMPOSITION FOR GLASS TO METAL SEAL
Filed Feb. 2, 1956
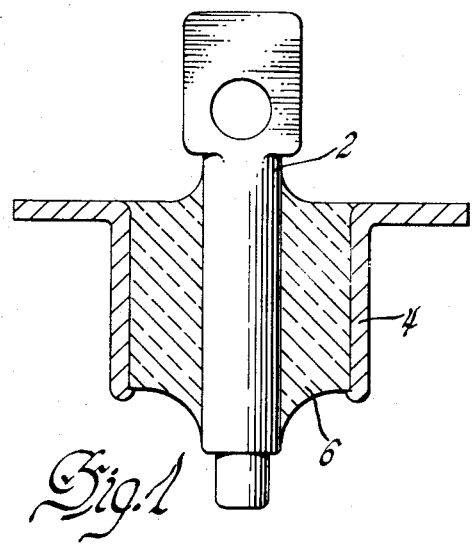
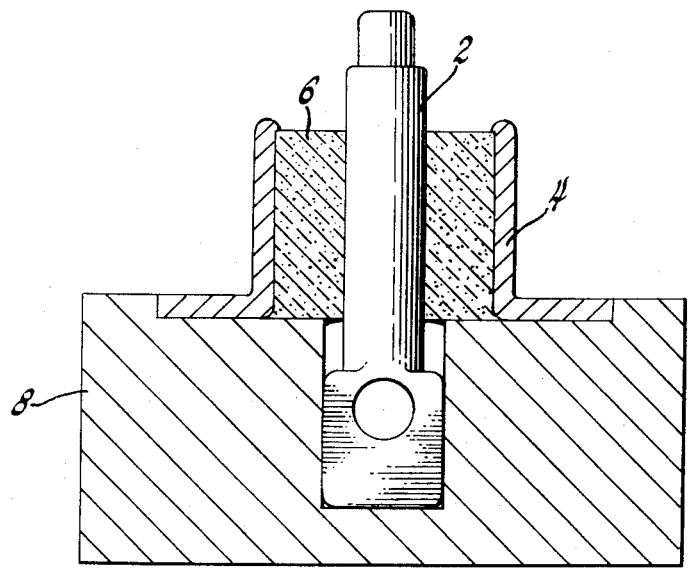
INVENTOR
Richard L. Comer
BY
ATTORNEY

United States Patent Office 2,949,376
Patented Aug. 16, 1960

2,949,376

COMPOSITION FOR GLASS TO METAL SEAL

Richard L. Comer, Grand Blanc, Mich., assignor to General Motors Corporation, Detroit, Mich., a corporation of Delaware Filed Feb. 2, 1956, Ser. No. 563,102

2 Claims. (Cl. 106—53)

This invention relates to metal-to-glass seals of the type used for gas impervious lead-ins and the like. It has as one of its objects the provisions of an improved glass-to-metal seal which is gas impervious even at high pressures, which is resistant to cracking and other failures over a wide heat range, and which may be economically manufactured from relatively low cost materials.

Another object of the invention is the provision of an improved composition which adheres well to iron and ferrous base alloys such as soft steel and which has a coefficient of expansion and resilience, such as it is highly suited for the manufacture of improved glass-to-ferrous metal seals.

Other objects and the various advantages of the invention will appear more clearly from the following detailed description of a preferred embodiment thereof and from the drawings in which:

Figure 1 is a side view in section of a glass-to-metal seal made in accordance with the invention; and Figure 2 is a side view in section of the seal shown in Figure 1 during one step in its manufacture.

Referring now to the drawings, there is shown in Figure 1 a typical glass-to-metal seal made in accordance with the invention and comprising lead-in wire 2 bonded concentrically within metal collar 4 by glass 6 which serves as an electrical insulator and which is bonded to both the lead-in wire and the collar so as to form a gas-tight seal. In accordance with the invention, the metal wire 2 and collar 4 to which the glass is bonded are of iron or a ferrous base alloy and the glass 6 has a composition within the following range:

| | Percent |
|---|---|
| $SiO_2$ | 30 to 60 |
| $Al_2O_3$ | 3 to 5 |
| $B_2O_3$ | 15 to 22 |
| PbO | 20 to 30 |
| Alkaline oxide | 5 to 12 |
| $Co_3O_4$ | } Up to 1 |
| $Mn_3O_4$ | |
| Alkaline earth oxide | Up to 3 |
| $TiO_2$ | Up to 2 |

This glass may be prepared by fusing a mixture of from 60% to 80% of a lead borosilicate frit with from 20% to 40% of a dehydrated ground coat enamel, the following being typical compositions by analysis of the two specified ingredients used in the mixture:

*Lead borosilicate frit*

| | Percent |
|---|---|
| $SiO_2$ | 33.65 |
| PbO | 36.14 |
| $Al_2O_3$ | 4.46 |
| $TiO_2$ | .26 |
| $Fe_2O_3$ | .17 |
| $Li_2O$ | 2.04 |
| CaO | .50 |
| MgO | 1.17 |
| $Na_2O$ | 2.80 |
| $K_2O$ | .07 |
| $B_2O_3$ | 18.68 |

*Dehydrated ground coat enamel*

| | Percent |
|---|---|
| $SiO_2$ | 52.95 |
| CuO | .14 |
| PbO | .05 |
| $Al_2O_3$ | 2.74 |
| $TiO_2$ | 2.48 |
| $Fe_2O_3$ | .72 |
| $Na_2O$ | 14.03 |
| $K_2O$ | 1.15 |
| CaO | 2.58 |
| $Co_3O_4$ | 1.23 |
| $Mn_3O_4$ | 1.04 |
| MgO | .42 |
| $B_2O_3$ | 20.47 |
| NiO | less than 1 |

The preferred glass composition may be prepared by fusing a mixture containing about 66⅔% of the lead borosilicate frit and 33⅓% of the dehydrated ground coat enamel. The resultant composition of this preferred glass shows upon analysis: $SiO_2$ about 40%, $Al_2O_3$ about 4%, $B_2O_3$ about 19%, PbO about 24%, alkaline oxide about 8%, $Co_3O_4$ plus $Mn_3O_4$ about .75%, alkaline earth oxide about 2%, $TiO_2$ about 1%, plus incidental impurities. Typical glass having this preferred composition gave the following actual analysis:

| | Percent |
|---|---|
| $SiO_2$ | 40.09 |
| $Al_2O_3$ | 3.88 |
| $B_2O_3$ | 19.27 |
| PbO | 24.11 |
| $Li_2O$ | 1.36 |
| $Na_2O$ | 6.54 |
| $K_2O$ | .43 |
| CaO | 1.19 |
| MgO | .92 |
| $Co_3O_4$ | .41 |
| $Mn_3O_4$ | .34 |
| $TiO_2$ | .99 |
| $Fe_2O_3$ | .35 |
| CuO | Trace |
| NiO | Trace |

From the above, it will be obvious to those skilled in the art that the ratio of $Co_3O_4$ to $Mn_3O_4$ can vary, it being required, however, that both be present in amounts such that the total amount of these two oxides not exceed 1% on analysis.

It is proposed that the ferrous metal parts be of iron or of a ferrous alloy containing not in excess of about .5% manganese, not in excess of about .15% carbon and the remainder substantially all iron. For example, the collar 4 may advantageously be of commercially pure iron (typical analysis: .012% carbon, .017% manganese, .005% phosphorous, .025% sulfur, remainder iron) and the wire 2 of cold rolled or soft steel showing on analysis: .08–.13% carbon, .3–.5% manganese, .04% max. phosphorous, .05% max. sulfur, remainder iron. However, other ferrous base metals may be used if desired.

In manufacturing an electrical lead-in of the type shown in Figure 1 of the accompanying drawing, the following procedure may be used to advantage. First, iron collar 4 and cold rolled steel wire 2 are pickled in a 6% solution of sulfuric acid at 160° F. for 15 minutes, rinsed in hot water and then in a .4% solution of borax for another 15 minutes at 160° F. After rinsing and drying, the collar and lead wire are arranged concentrically with respect to each other in a suitable jig 8, as shown in Figure 2, and a pulverized uniform mixture of frit and enamel as above described is rammed tightly between the metal parts with sufficient pressure to form a self-sustaining compact mass. The assembly is then placed in a furnace and heated to about 1600° F. thereby causing fusing of the mixture and formation of the glass seal. On cooling, the glass, which may be somewhat blue in color due to the presence of cobalt, forms a good seal with the metal parts.

Heretofore it has been the common practice to use relatively expensive and often scarce alloys for the metal parts in glass-to-metal seals in order to accomplish sufficient matching of the coefficients of expansion of the metal and glass. The present invention constitutes a marked improvement in that excellent glass-to-metal seals may be formed with relatively inexpensive iron and high iron alloy parts. In the preferred embodiment the cold rolled steel lead-in wire and the iron collar, both of which contain in excess of 99% iron, are far less expensive than the relatively high cobalt alloys heretofore commonly used in glass-to-metal seals.

It is to be understood that while the invention has been described chiefly by reference to a particular embodiment thereof, it is not so limited since various changes and modifications may be made, all within the full and intended scope of the claims which follow.

I claim:

1. A glass for use in glass-to-metal seals having a composition showing upon analysis:

| | Percent |
|---|---|
| $SiO_2$ | 30 to 60. |
| $Al_2O_3$ | 3 to 5. |
| $B_2O_3$ | 15 to 22. |
| PbO | 20 to 30. |
| Alkaline oxide | 5 to 12. |
| $Co_3O_4$ / $Mn_3O_4$ | Present in an amount up to 1. |
| Alkaline earth oxide | Present in an amount up to 3. |
| $TiO_2$ | Present in amount up to 2. |

2. A glass for use in glass-to-metal seals having a composition showing upon analysis: $SiO_2$ about 40%, $Al_2O_3$ about 4%, $B_2O_3$ about 19%, PbO about 24%, alkaline oxide about 8%, $Co_3O_4$ plus $Mn_3O_4$ about .75%, alkaline earth oxide about 2%, $TiO_2$ about 1%, plus incidental impurities.

References Cited in the file of this patent

UNITED STATES PATENTS

| | | |
|---|---|---|
| 1,508,455 | Kraus | Sept. 6, 1924 |
| 2,101,114 | Walker | Dec. 7, 1937 |
| 2,299,750 | Hull et al. | Oct. 27, 1942 |
| 2,393,448 | Armistead | Jan. 22, 1946 |
| 2,468,868 | Danzin | May 3, 1949 |
| 2,513,958 | Omley | July 4, 1950 |
| 2,549,504 | Messana | Apr. 17, 1951 |
| 2,561,520 | Lemmens et al. | July 24, 1951 |
| 2,603,915 | Lysak | July 22, 1952 |
| 2,637,797 | Schenk | May 5, 1953 |
| 2,653,877 | Deyrup | Sept. 29, 1953 |
| 2,669,807 | Smith | Feb. 23, 1954 |
| 2,669,808 | Duncan | Feb. 23, 1954 |
| 2,693,423 | Rogers | Nov. 2, 1954 |
| 2,768,475 | Seelen et al. | Oct. 30, 1956 |
| 2,770,923 | Dalton et al. | Nov. 20, 1956 |
| 2,784,532 | Griffiths | Mar. 12, 1957 |